UNITED STATES PATENT OFFICE.

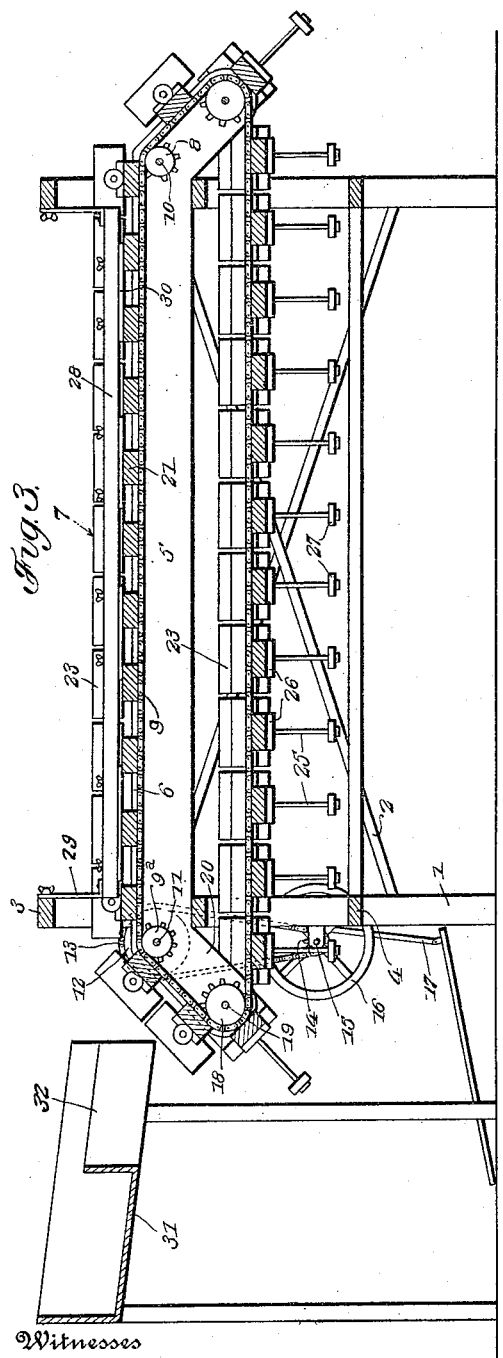

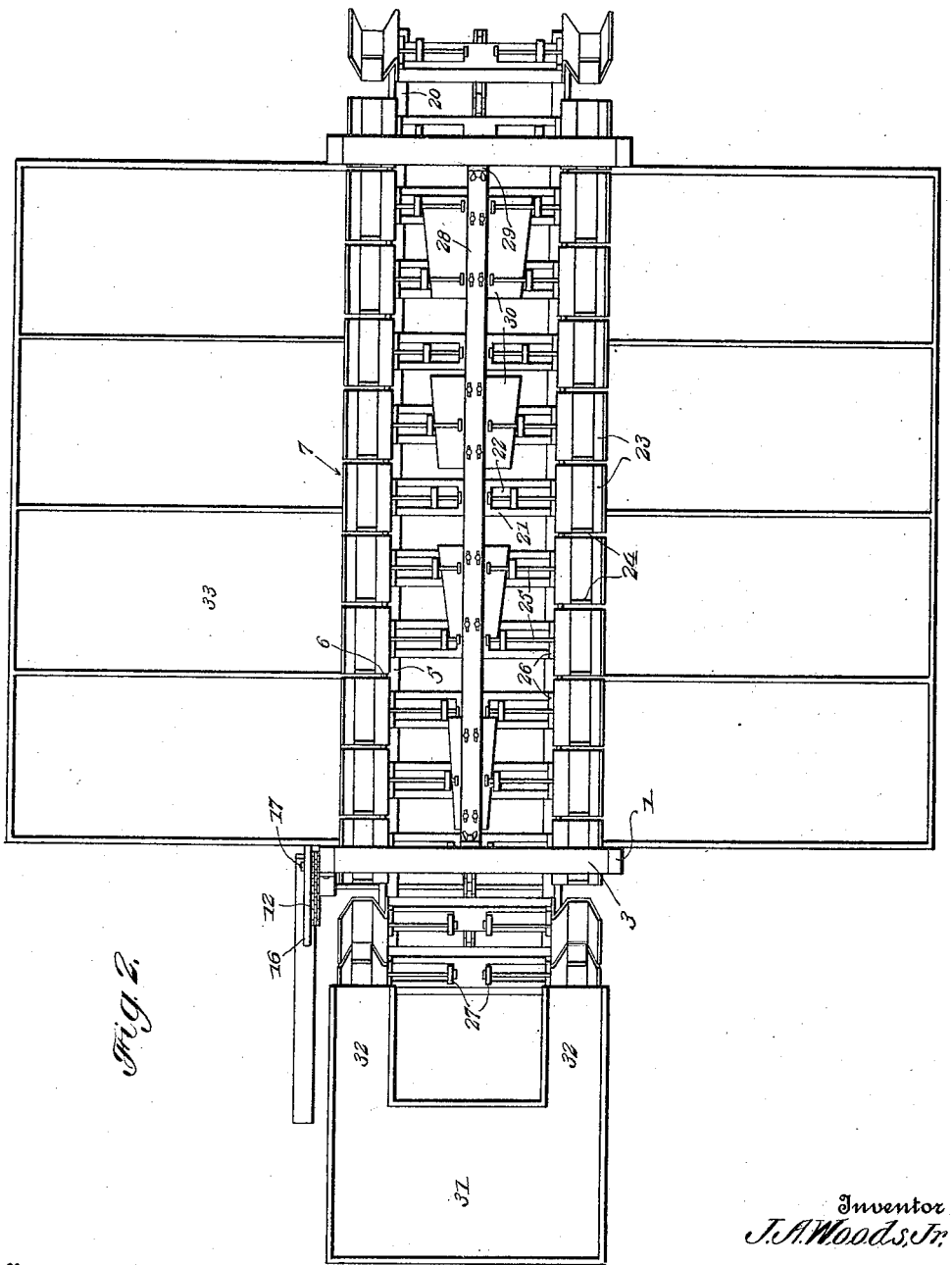

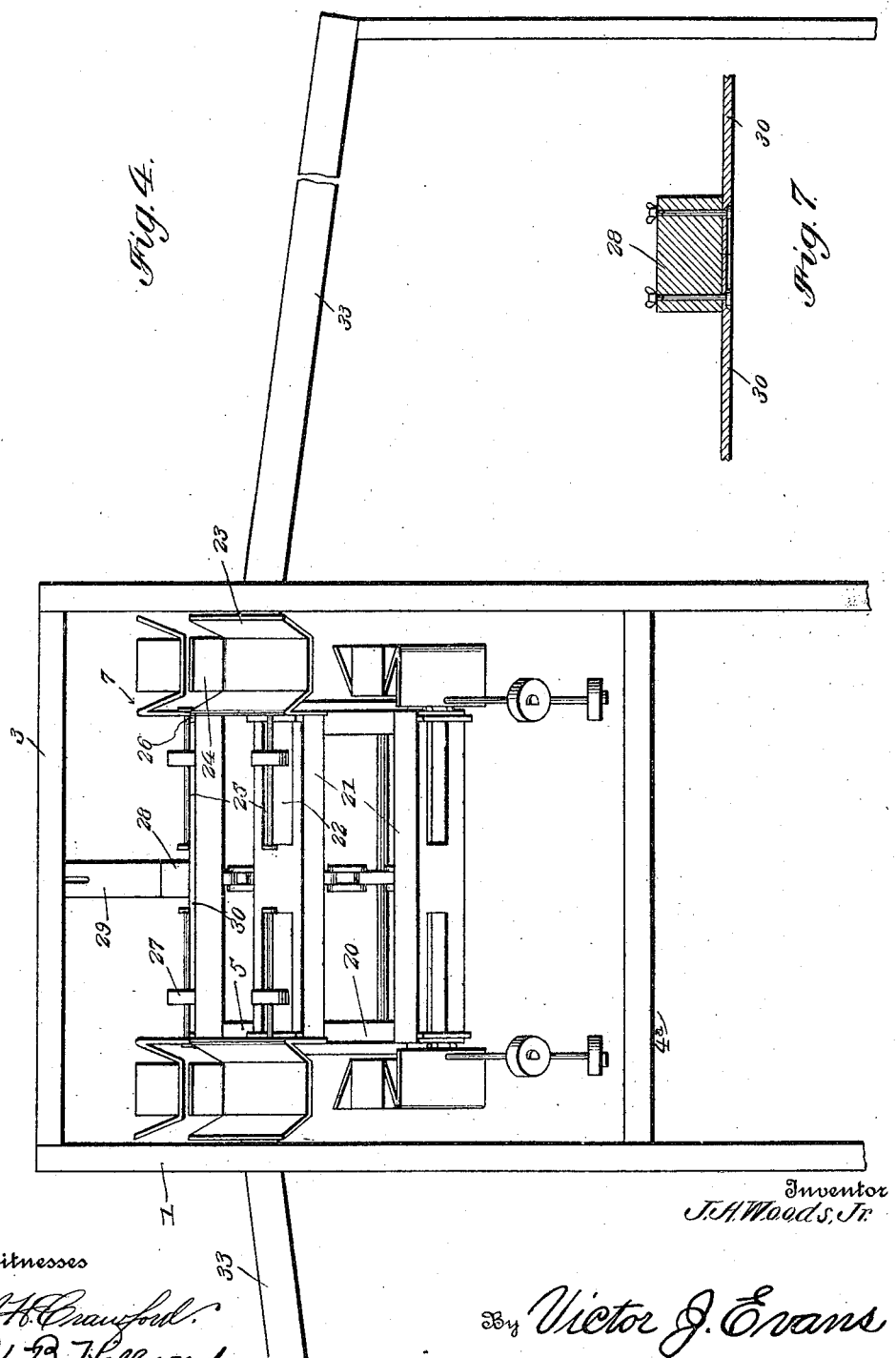

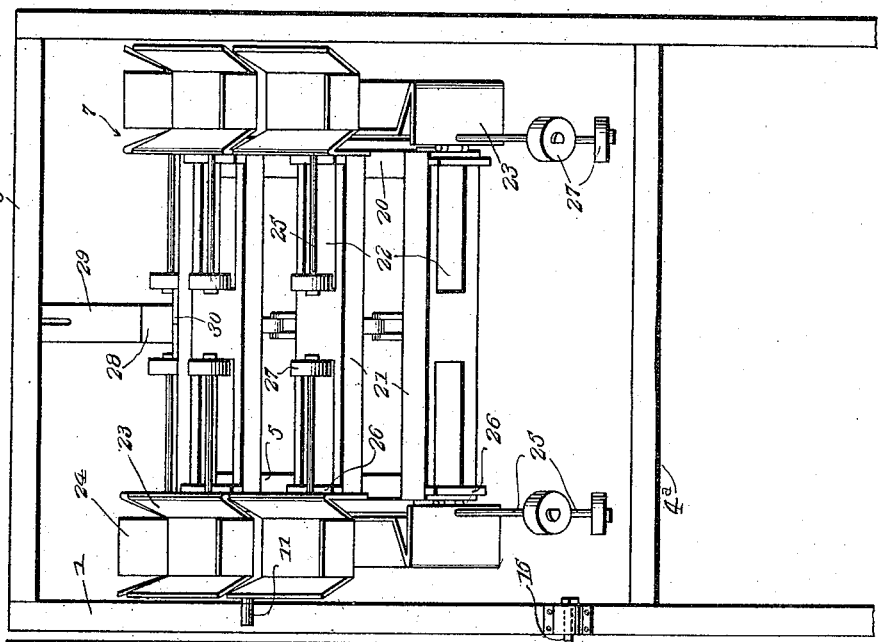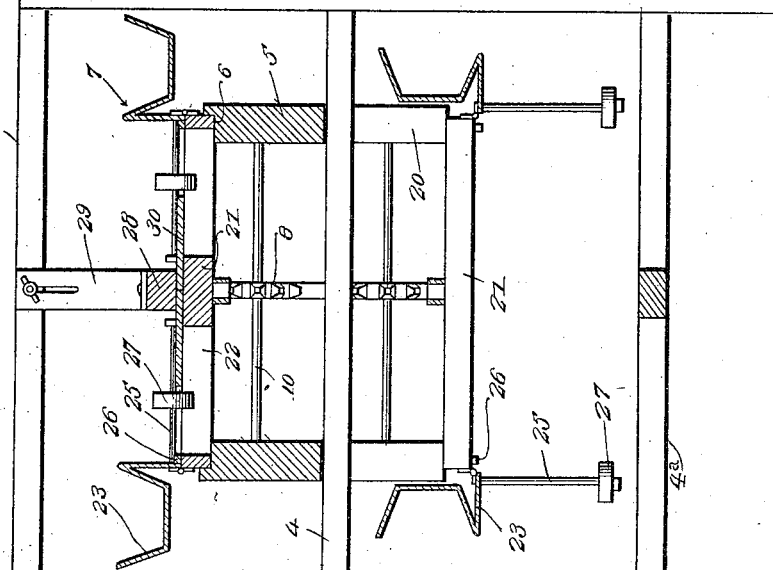

JAMES A. WOODS, JR., OF OGDEN, UTAH, ASSIGNOR TO WOODS AUTOMATIC FRUIT GRADING MACHINE COMPANY, OF OGDEN, UTAH, A CORPORATION OF UTAH.

FRUIT-GRADING MACHINE.

1,132,506.  Specification of Letters Patent.  Patented Mar. 16, 1915.

Application filed January 21, 1914. Serial No. 813,524.

*To all whom it may concern:*

Be it known that I, JAMES A. WOODS, Jr., a citizen of the United States, residing at Ogden, in the county of Weber and State of Utah, have invented new and useful Improvements in Fruit-Grading Machines, of which the following is a specification.

The invention provides a machine of novel structure which is designed primarily for assorting and grading fruit but which may be advantageously used for separating other products and commodities according to bulk and weight, the machine being automatic in action and utilizing weights as means for determining the separation of the articles according to their relative mass.

The invention consists of an endless carrier provided with tilting cups which are adapted to receive the fruit, product or other articles to be separated, each of such cups being provided with a counter-balancing weight slidingly mounted upon an arm or beam, such weight being moved to a given position upon the arm or beam by means of trips which are adjustable and set according to requirement, the cups tilting when the weight of the fruit or article overbalances the counter-poise, thereby admitting of the automatic discharge of the fruit or article into a prearranged receptacle.

The invention also consists of cups or article receiving receptacles of peculiar form and mounted in a novel manner so as to maintain a given position under normal conditions, but which cups tilt under the preponderance of weight of the article held thereby, so as to automatically discharge such article into a receptable arranged to receive the same, the cups and their counter-balancing weights being automatically returned to normal position prior to receiving the successive fruit or article in the cycle of operation of the machine.

The invention further consists of unique instrumentalities for automatically moving the counter-balancing weights to effect the required separation of the fruit or articles into various grades according to weight, said means embodying trips which are adjustable to admit of automatic movement of the counter-poise to the required part upon the arms or beams of the article receiving cups or receptacles.

The invention also further consists of the novel form of mountings for the cups or article receiving receptacles and the means for supporting such cups and their counterpoise in the required position both prior to being tripped and subsequent to the tripping operation by means of which the articles are discharged at the required point in order to insure the grades being separated.

The invention furthermore consists of the novel features, details of construction and combination of parts which hereinafter will be more particularly set forth, illustrated and claimed.

In the drawings hereto attached:—Figure 1 is a side view of a grading machine embodying the invention. Fig. 2 is a top plan view. Fig. 3 is a vertical central longitudinal section. Fig. 4 is a front view. Fig. 5 is a transverse section. Fig. 6 is a rear view, the hopper being omitted. Fig. 7 is an enlarged section of a set of trips and their supporting strip.

Corresponding and like parts are referred to in the following description and indicated in all the views of the drawings, by the same reference characters.

The machine embodies a suitable framework, an endless carrier, tilting cups or article receiving receptacles attached to the endless carrier and movable therewith, counter-poises for such cups or receptacles, adjustable trips for moving the counter-poises to the required position upon the supporting beams or arms, means for receiving the articles when automatically delivered so as to keep the several grades separated, and a hopper for receiving the articles to be separated in bulk.

It is to be understood that the framework and supporting parts will vary according to the particular design and adaptation of the invention. In the embodiment illustrated in the accompanying drawings the framework comprises uprights or legs 1, suitable braces 2, upper cross pieces 3, intermediate and lower cross pieces 4 and 4ª and longitudinal members 5, the latter being secured at their ends in any substantial manner to the cross pieces 4 and having their upper edges rabbeted on their inner sides as indicated at 6. The longitudinal members 5 constitute a track for the upper portion of the endless carrier 9 which preferably consists of a chain that is supported at its ends by means of pulleys or sprocket wheels 8 and 9ª which are secured to shafts 10 and 11 which are journaled in bearings attached to the longitudinal members 5. Power is adapted to be applied in any manner to one or the other of such shafts for imparting movement to the endless carrier. As shown a sprocket wheel 12 is fastened to the projecting end of the shaft 11 and a sprocket chain 13 connects such sprocket wheel 12 with a sprocket pinion 14 secured to a power driven shaft 15 having a fly wheel 16 secured thereto. For the sake of simplicity of illustration power is adapted to be applied by foot to the fly wheel 16 by means of a pedal operated pitman 17. The rear portion of the endless carrier passes around a sprocket wheel 18 which is secured to a shaft 19 which is mounted in the lower rear ends of inclined bars 20 which form extensions of the members 5 and likewise constitute elements of the track. Cross bars 21 are secured at a middle point to links of the endless carrier 7 and are of a length to rest upon the rabbeted portions 6 of the longitudinal members 5 whereby such cross bars are prevented from movement transversely of the machine which is essential to the accuracy of the assorting mechanism within certain limits. The cross bars 21 are regularly spaced and their outer sides are cut out as indicated at 22 so as not to interfere with the free movements of the counter-balancing weights upon their supporting arms or beams which are attached to the cups or article receiving receptacles.

The cups or receptacles 23 for receiving the fruit or other articles to be separated are hingedly connected in the outer ends of the cross bars 21 in such a manner as to tilt laterally to discharge the articles into suitable receivers at the sides of the machine. The cups 23 may be of any construction and are usually formed of sheet metal, the sides of which flare. Each of the cups may be closed at opposite ends but in practice it is found sufficient to have the cup closed at its rear end only as indicated at 24, such rear end constituting a spacer which prevents more than one article entering the cup, the end of the preceding cup serving to prevent the article from leaving the succeeding cup by a forward movement. The cups are pivoted or hinged to the cross bars 21 in any manner to tilt outwardly and downwardly, the cups being supported in the tilted position by resting against the outer sides of the members 5. Each of the cups or receptacles 23 has an arm or beam 25 which when the cup is in normal position extends horizontally and is supported upon a stud 26 at the outer end of the cross bar 21. A weight or counter-poise 27 is slidably mounted upon the arm or beam 25 and acts as a counterbalance for the fruit or articles to be separated. It is to be understood that the position of the weight or counter-poise 27 upon the arm or beam 25 determines the weight necessary to effect a tilting of the cup or receptacle 23. When the cup starts to tilt the weight moves inward thereby insuring a quick action of the cup in discharging its contents. When the cups clear the outer ends of the track members 5 they assume a position with the arms or beams 25 hanging pendant and as a result the weights or counter-poises 27 move to the lower or outer ends of the arms 25. As the cups reach the inner or rear end of the machine they engage the lower ends of the inclined bars or track members 20 which serve to bring such cups into horizontal position so as to receive other articles to be assorted in the continued operation of the machine.

The weights or counter-poises 27 are automatically positioned upon the arms or beams 25 by means which are adapted to be set according to a predetermined arrangement according to the various grades into which the articles are to be separated. As shown in the attached drawings these means embody a longitudinal strip 28 which is supported by means of the upper cross pieces 3 through the instrumentality of hangers 29 which are adjustably connected to such cross pieces whereby the strips 28 may be properly positioned. A plurality of trips 30 are adjustably connected to the strip 28 at intervals in its length and project from opposite edges so as to engage the weights 27 and move the same inward upon the supporting arms 25. Each of the trips 30 has its outer edge inclined so as to engage with a weight and move the same inward upon its arm. The trips 30 are laterally adjustable so as to project to a greater or less extent from the edges of the strip 28 whereby the weights 27 may be moved to the required position upon the arms. The receiving end of the machine is designated as the rear end and the delivery end as the outer or front end. When adjusting the trips 30 those nearest the rear end of the machine are moved outward to a less extent than those at the outer end of the machine and as a result the fruit or articles first delivered are heavier than those subsequently delivered, the delivery being graduated and determined by the relative position of the trips. The heaviest fruit is delivered at the rear end of the machine and the lightest fruit at the outer end thereof.

A hopper 31 is located at the rear end of the machine to receive the fruit or articles in bulk and runways 32 lead from the hopper to the cups at the sides of the machine to direct the fruit to such cups. As the cups or receptacles come in position to receive the fruits or articles from the runways 32 they incline rearward and the rear ends 24 of the cups in position to receive the fruit engage with the fruit or articles next in order to be taken up, thereby preventing more than one article entering each cup or receptacle. As the endless carrier travels with its upper portion moving forward the weights receive an initial movement upon the arms 5 and rearmost trips and if the fruit is too light to overbalance such weights the latter are again moved by the second set of trips and so on in succession until the fruit or articles by its preponderance of weight overcomes the counter-poises and causes the cups to tilt. Receivers 33 are located at the sides of the machine to receive the fruit or articles as they are discharged from the machine, such receivers holding the fruit or articles separated.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative and that such changes may be made when desired as are within the scope of the claims appended hereto.

Having thus described the invention what is claimed as new, is:—

1. In a grading machine, the combination of a carrier, a cup pivotally connected with the carrier to move therewith and adapted to tilt for discharging the contents, a counter-balance for the cup to hold the same in a given position and a trip arranged in the path of the counter-balance and adjustable to move such counter-balance to a prearranged position.

2. In a grading machine, the combination of a plurality of cups mounted to tilt, means for moving such cups in a prescribed path, arms projecting laterally from the cups, weights slidingly mounted upon the arms and a plurality of trips arranged in the path of the weights and adjustable to move such weights by stages.

3. In a grading machine, the combination of an endless carrier, cups having pivotal connection with side portions of the carrier, arms extending inwardly from the cups, weights slidably mounted upon the arms, a support arranged between the opposed sets of cups and trips adjustably connected with such support to engage with the weights and move the same by stages so as to offer a greater or less resistance to the tilting of the cups.

In testimony whereof I affix my signature in presence of two witnesses.

JAMES A. WOODS, Jr.

Witnesses:
R. P. MAYES,
RICHARD I. MILLS.

Copies of this patent may be obtained for five cents each, by addressing the "Commissioner of Patents, Washington, D. C."